United States Patent
Peterson et al.

(10) Patent No.: US 10,271,210 B2
(45) Date of Patent: Apr. 23, 2019

(54) SYSTEM FOR AUTHENTICATING A USER AND ENABLING REAL-TIME APPROVAL NOTIFICATIONS

(71) Applicant: Bank of America Corporation, Charlotte, NC (US)

(72) Inventors: Kristen Marie Peterson, Doylestown, PA (US); Smita Sahu, Kendall Park, NJ (US); Thomas E. Campbell, Acton, MA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 331 days.

(21) Appl. No.: 15/209,246

(22) Filed: Jul. 13, 2016

(65) Prior Publication Data

US 2018/0020348 A1 Jan. 18, 2018

(51) Int. Cl.
*H04W 12/06* (2009.01)
*H04L 29/06* (2006.01)
*G06F 21/31* (2013.01)
*G06F 21/35* (2013.01)

(52) U.S. Cl.
CPC ............ *H04W 12/06* (2013.01); *G06F 21/31* (2013.01); *G06F 21/35* (2013.01); *H04L 63/0853* (2013.01); *H04L 63/0876* (2013.01); *H04L 63/102* (2013.01); *H04L 63/126* (2013.01)

(58) Field of Classification Search
CPC ..... H04L 63/04; H04L 63/126; H04L 63/102; H04L 63/0853; H04L 63/0876; H04W 12/06; G06F 21/606; G06F 21/31; G06F 21/35

USPC .................................. 713/165; 726/26, 28, 7
See application file for complete search history.

(56) References Cited

U.S. PATENT DOCUMENTS

| | | | | |
|---|---|---|---|---|
| 9,043,386 | B2* | 5/2015 | Halevi | G06F 17/243 709/203 |
| 9,251,316 | B2* | 2/2016 | Miyamoto | H04W 4/21 |
| 9,665,638 | B2* | 5/2017 | Eigner | H04L 67/30 |
| 10,122,729 | B2* | 11/2018 | Kopf | H04L 63/102 |
| 2002/0178187 | A1* | 11/2002 | Rasmussen | G06F 17/243 715/234 |
| 2014/0289331 | A1* | 9/2014 | Chan | G06F 9/54 709/204 |

(Continued)

*Primary Examiner* — Saleh Najjar
*Assistant Examiner* — Feliciano S Mejia
(74) *Attorney, Agent, or Firm* — Michael A. Springs; Moore & Van Allen PLLC; James C. Edwards

(57) ABSTRACT

Embodiments authenticate a user and an associate of an entity and enable real-time approval notifications by requesting one or more authentication credentials from the associate; authenticating the associate based on successful validation of the one or more authentication credentials received from the associate; populating an application for the user at least in part by receiving input from the associate; establishing a secure wireless communication channel with a user device; and wirelessly transmitting, from the system to the user device and over the secure wireless communication channel the populated application; instructions to cause the user device to authenticate the user based on successful validation of one or more user authentication credentials; and instructions to cause the user device, in response to authenticating the user, present the populated application to the user for verification of its accuracy.

18 Claims, 9 Drawing Sheets

(56) References Cited

U.S. PATENT DOCUMENTS

| | | | |
|---|---|---|---|
| 2015/0082372 A1* | 3/2015 | Kottahachchi | H04L 63/08 726/1 |
| 2015/0310188 A1* | 10/2015 | Ford | G06F 21/10 726/28 |
| 2017/0236060 A1* | 8/2017 | Ignatyev | G06N 5/02 706/46 |
| 2017/0337194 A1* | 11/2017 | Gilchrist | G06F 3/0482 |
| 2017/0372310 A1* | 12/2017 | Narasimhan | G06Q 20/401 |

* cited by examiner

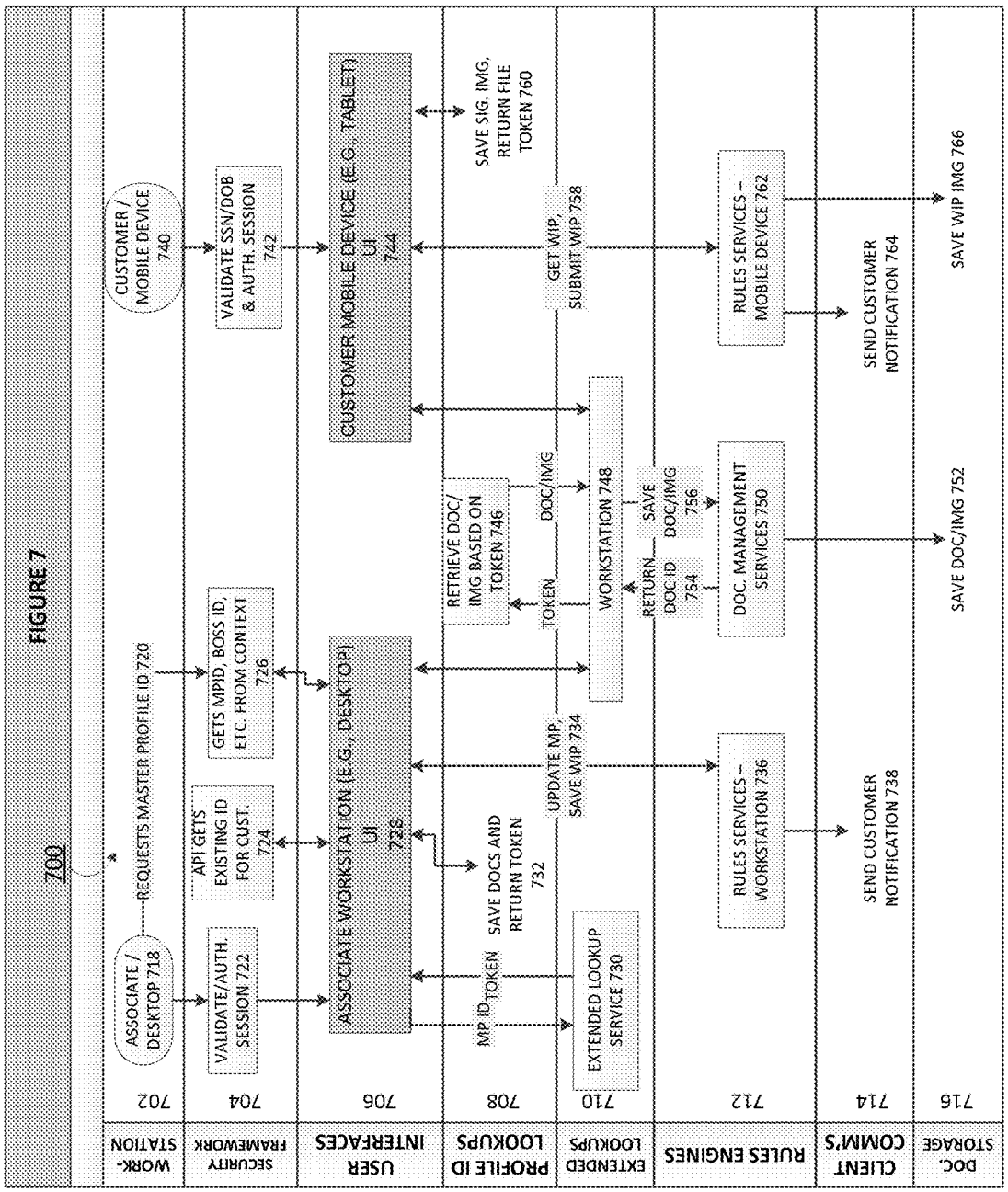

ns directed to a novel authentication device that is configured to capture credentials of associates and users and facilitate real-time approval notifications.

SYSTEM FOR AUTHENTICATING A USER AND ENABLING REAL-TIME APPROVAL NOTIFICATIONS

FIELD OF THE INVENTION

Embodiments of the invention are directed to a novel authentication device that is configured to capture credentials of associates and users and facilitate real-time approval notifications.

BACKGROUND

Typically, in order to perform certain actions with an entity, customers are required to fill out application(s) after during and/or after visiting a physical location and to sign the application(s) and submit them, which often occurs after the in-person visit if at all. Thus, a need exists for a secure and accurate device and system of authorizing and/or authenticating the user and an associate of an entity electronically, and enabling real-time approval notifications, which addresses the above listed shortcomings of conventional activities.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for authenticating a user and an associate of an entity and enabling real-time approval notifications. Embodiments of the system include a processor operatively connected with at least one memory device and a real-time approval module stored in the at least one memory device comprising computer readable instructions, that when executed by the at least one processor, cause the at least one processor to request one or more authentication credentials from the associate; authenticate the associate based on successful validation of the one or more authentication credentials received from the associate; populate an application for the user at least in part by receiving input from the associate; establish a secure wireless communication channel with a user device; wirelessly transmit, from the system to the user device and over the secure wireless communication channel the populated application; instructions to cause the user device to authenticate the user based on successful validation of one or more user authentication credentials; and instructions to cause the user device, in response to authenticating the user, present the populated application to the user for verification of its accuracy.

In some embodiments, the computer readable instructions further cause the at least one processor to receive, from the user device and over the secure wireless communication channel, confirmation that the populated application is accurate; and, in response to receiving confirmation that the populated application is accurate, submitting the populated application to a back-end system for acting on the populated application. In some such embodiments, the computer readable instructions further cause the at least one processor to receive, from the backend system, confirmation that the populated application has been accepted by the backend system; and transmit instructions to the user device to cause the user device to alert the user that the populated application has been accepted.

In some embodiments, the computer readable instructions further cause the at least one processor to receive, from the user device and over the secure wireless communication channel, an indication that the populated application is at least partially inaccurate; in response to receiving the indication that the populated application is at least partially inaccurate, unlock the application for editing by the associate; receive one or more edits from the associate and apply them to a repopulated application; and wirelessly transmit instructions, to the user device and over the secure wireless communication channel, to cause the user device to present the repopulated application to the user for verification of its accuracy. In some such embodiments, the computer readable instructions further cause the at least one processor to receive, from the user device and over the secure wireless communication channel, confirmation that the repopulated application is accurate; and, in response to receiving confirmation that the repopulated application is accurate, submitting the repopulated application to a back-end system for acting on the repopulated application. In some of these embodiments, the computer readable instructions further cause the at least one processor to receive, from the backend system, confirmation that the repopulated application has been accepted by the backend system; and transmit instructions to the user device to cause the user device to alert the user that the repopulated application has been accepted.

In some embodiments, the computer readable instructions further cause the at least one processor to wirelessly transmit instructions, to the user device and over the secure wireless communication channel, to cause the user device to request and receive a user signature verifying that the populated application is accurate; receive, from the user device and over the secure wireless communication channel, confirmation that the populated application is accurate, the confirmation comprising an electronic copy of the user's signature; and, in response to receiving confirmation that the populated application is accurate, submitting the populated application and the electronic copy of the user's signature to a back-end system for acting on the populated application. In some such embodiments, the computer readable instructions further cause the at least one processor to receive verification from the back-end system that the electronic copy of the user's signature matches a stored copy of the user's signature, thereby further validating the user's identity. In other such embodiments, the computer readable instructions further cause the at least one processor to cause the electronic copy of the user's signature to be stored and associated with the populated application for subsequent retrieval and verification of confirmation of the accuracy of the populated application.

In some embodiments, the computer readable instructions further cause the at least one processor to receive an indication, from the associate, that the populated application is ready for transmission to the user device; in response, establish the secure wireless communication channel with the user device; close editing access, at the system and by the associate, to the populated application; grant viewing access and limited editing access, at the user device and by the authenticated user, to view the populated application and to submit a user signature, without granting editing access to the populated application other than for submitting the user signature and date. In some embodiments, the computer readable instructions further cause the at least one processor to receive the user signature, from the user device and over the secure wireless communication channel; in response, close viewing access and limited editing access, at the user device and by the authenticated user; and grant viewing access to the populated application and the user signature, at the system and by the authenticated associate. In some such embodiments, the computer readable instructions further cause the at least one processor to receive verification, from the associate, that the populated application and user signature is ready for submission to a back-end system for acting on the populated application; in response to receiving the user signature and associate verification that the populated application is ready for submission, submitting the populated application and an electronic copy of the user's signature to a back-end system for acting on the populated application.

According to embodiments of the invention, a computer program product for authenticating a user and an associate of an entity and enabling real-time approval notifications, includes a non-transitory computer-readable storage medium having computer-executable instructions to request one or more authentication credentials from the associate; authenticate the associate based on successful validation of the one or more authentication credentials received from the associate; populate an application for the user at least in part by receiving input from the associate; establish a secure wireless communication channel with a user device; wirelessly transmit, from the system to the user device and over the secure wireless communication channel the populated application; instructions to cause the user device to authenticate the user based on successful validation of one or more user authentication credentials; and instructions to cause the user device, in response to authenticating the user, present the populated application to the user for verification of its accuracy.

In some embodiments, the computer-executable instructions are further to receive, from the user device and over the secure wireless communication channel, confirmation that the populated application is accurate; and, in response to receiving confirmation that the populated application is accurate, submitting the populated application to a back-end system for acting on the populated application. In some such embodiments, the computer-executable instructions are further to receive, from the backend system, confirmation that the populated application has been accepted by the backend system; and transmit instructions to the user device to cause the user device to alert the user that the populated application has been accepted.

In some embodiments, the computer-executable instructions are further to receive, from the user device and over the secure wireless communication channel, an indication that the populated application is at least partially inaccurate; in response to receiving the indication that the populated application is at least partially inaccurate, unlock the application for editing by the associate; receive one or more edits from the associate and apply them to a repopulated application; and wirelessly transmit instructions, to the user device and over the secure wireless communication channel, to cause the user device to present the repopulated application to the user for verification of its accuracy. In some such embodiments, the computer-executable instructions are further to receive, from the user device and over the secure wireless communication channel, confirmation that the repopulated application is accurate; and, in response to receiving confirmation that the repopulated application is accurate, submitting the repopulated application to a backend system for acting on the repopulated application. In some of these embodiments, the computer-executable instructions are further to receive, from the backend system, confirmation that the repopulated application has been accepted by the backend system; and transmit instructions to the user device to cause the user device to alert the user that the repopulated application has been accepted.

In some embodiments, the computer-executable instructions are further to wirelessly transmit instructions, to the user device and over the secure wireless communication channel, to cause the user device to request and receive a user signature verifying that the populated application is accurate; receive, from the user device and over the secure wireless communication channel, confirmation that the populated application is accurate, the confirmation comprising an electronic copy of the user's signature; and, in response to receiving confirmation that the populated application is accurate, submitting the populated application and the electronic copy of the user's signature to a back-end system for acting on the populated application.

According to embodiments of the invention, a computerized method for authenticating a user and an associate of an entity and enabling real-time approval notifications includes requesting one or more authentication credentials from the associate; authenticating the associate based on successful validation of the one or more authentication credentials received from the associate; populating an application for the user at least in part by receiving input from the associate; establishing a secure wireless communication channel with a user device; and wirelessly transmitting, from the system to the user device and over the secure wireless communication channel the populated application; instructions to cause the user device to authenticate the user based on successful validation of one or more user authentication credentials; and instructions to cause the user device, in response to authenticating the user, present the populated application to the user for verification of its accuracy.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 7 is a diagram illustrating a process for user and associate authentication and real-time approval notifications, in accordance with embodiments of the invention.

DETAILED DESCRIPTION OF EMBODIMENTS OF THE INVENTION

Figure 1:
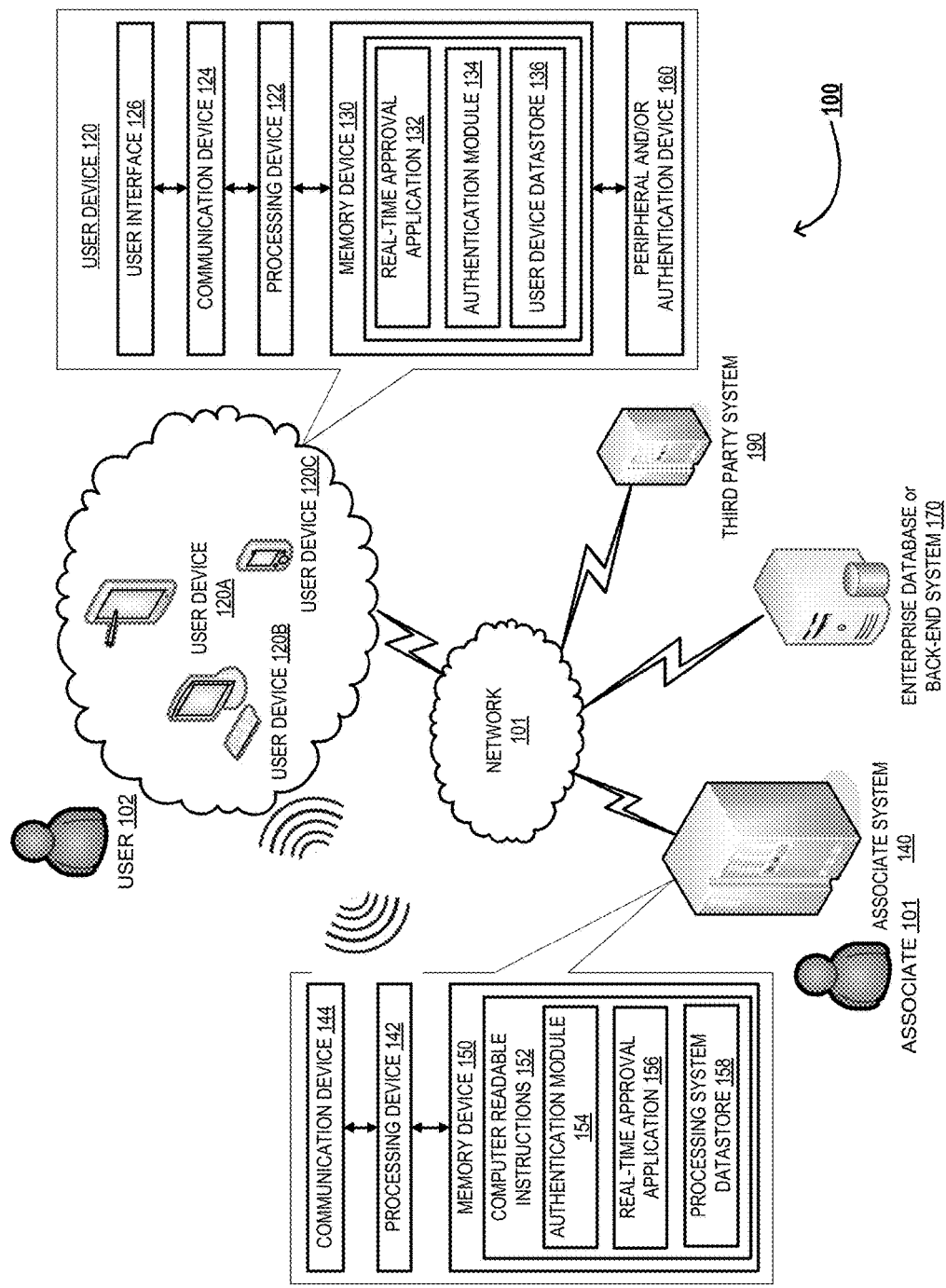
FIG. 1 is a diagram illustrating an authentication technology environment 100, in accordance with embodiments of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the term "user" may refer to a customer or the like, who utilizes an external apparatus, terminal or device capable of facilitating transactions or activities. In accordance with embodiments of the invention, the term "entity" may refer to a customer, seller, merchant, or the like. In some embodiments, the term "entity" may refer to a financial institution or a financial entity.

The term "user device" as used herein may refer to one or more electronic devices that facilitate user transactions or activities. As such, the terms "user transaction" or "user activity" may refer to financial or non-financial transactions or activities. In some embodiments a user device refers to one or more devices that facilitate execution of financial transactions. In this regard the user devices can comprise Automated Teller Machines (ATMs), Point of sale devices (POS), vending machines, checkout registers, ticket vending machines, automated retail transaction devices, banking terminals in a financial institution and other transaction terminals that involve financial transactions in one form or another. In some embodiments the user devices refers to devices that facilitate execution of non-financial transactions or activities, for example, check-in terminals for various industries, for example: hospitality, travel, healthcare and the like, information kiosks and other transaction terminals that do not involve a user performing a financial transaction via the user device. In some embodiments the user device enables execution of both financial and non-financial transactions/activities. In some embodiments, user devices may refer to devices that facilitate financial and/or non-financial transactions, such as laptop computers, tablet computers, smartphones, wearable devices, personal digital assistants (PDAs), and other portable or stationary computing devices. In some embodiments, the user devices may be owned, operated and/or otherwise associated entities and are installed at suitable locations, such that the user can travel to the location of the user device to execute transactions. In some embodiments, the user devices may be owned, operated and/or otherwise associated with the user. The embodiments described herein may refer to the initiation and completion of a transaction.

In some embodiments, the user may be required to provide authentication credentials for conducting user transactions at the user device. Typically user devices require the user to perform one or more authentication steps based on the level of authorization desired for a particular transaction. In this regard, the user may be required to slide cards with magnetic strips, provide one or more account numbers, userID and the like and often be required to provide the accompanying personal identification numbers (PIN), passwords, CVV numbers and the like associated with the individual transaction terminal and/or the individual card/account provided for authentication.

In general, the present invention provides an innovative, secure and accurate system and method of authorizing and/or authenticating the user and an entity associate electronically, so that the associate (e.g., a financial representative or advisor) may assist the customer/user by filling out an application (e.g., a new account application) on the associate's workstation. The associate, being knowledgeable of the common mistakes made by customer filling out applications, may ensure the application is filled out properly, thereby reducing the number of rejected applications due to errors in completion. Once the associate has authenticated his or her identity, the associate may retrieve, using the associate's workstation (i.e., the associate system) one or more applications, such as a new checking account application.

Of course, the associate may ask the customer which account the customer would like to open and select the appropriate application. In some cases, the associate system, once the customer's identity is known, may suggest one or more applications based on the customer's history with the entity and/or other information known about the customer. Once the desired application is selected, the associate may ask the customer one or more questions in order to get information to enter into the application. In some cases, the system automatically populates some or all the information in the application based on the customer's user profile stored with the entity.

Once the associate has completely populated the data fields of the application on the associate's workstation, the associate's system may then establish a secure wireless connection (or in some cases a wired connection) with a user device (e.g., a tablet computer). The user device may be tied to the associate workstation, such that it only connects with the specific associate's workstation. In this regard, the associate system and the user device may share a key or other security and/or authentication measures to ensure the user device is connecting with the appropriate associate workstation. The associate system may remove application editing privileges from the associate and transmit a copy of the populated application to the user device for review by the user. In some cases, once the user authenticates his or her identity, the user is granted only limited privileges such as the option to view the application to confirm its accuracy and to provide confirmation of its accuracy. The confirmation may include a signature, the date, and/or other authentication and/or identification confirmation credentials. If the user determines the application is inaccurate, then the user may tell the associate, who uses the associate system to re-open editing privileges on the associate system. In other cases, the user may be granted the privileges of making notes on the application or indicating which fields in the application may be inaccurate. However, the user is typically not granted editing privileges, which are reserved for the associate. Once the associate has corrected any errors with the application, the updated application is sent over to the user device for a second review by the user. Once the application is confirmed as accurate by the user and any required confirmation is provided (e.g., signature and date), the confirmed application is transmitted from the associate system to an enterprise database and/or back-end system for processing and decisioning. When a decision has been made on the application, a notification is transmitted from the back-end system to the associate system, which may then transmit the notification to the user device for display.

In some cases, is the customer wishes to open a second account or fill out another application, some or all the data entered by the customer in the first application may be used to pre-populate a second application. Typically, this functionality is only available during a single in-person session between the user and the associate. That is, once the user logs out or completes his or her meeting with the associate, then some or all the data that has been received from the user is removed from any temporary queue or memory where it was being stored for potential pre-population of additional applications.

In some cases, the application, its data and any confirmation data (e.g., an electronic copy of a signature and/or other inputted information) may be stored in an enterprise database for subsequent retrieval and review.

More specifically, various embodiments of the invention authenticate a user and an associate of an entity and enable real-time approval notifications by requesting one or more authentication credentials from the associate; authenticating the associate based on successful validation of the one or more authentication credentials received from the associate; populating an application for the user at least in part by receiving input from the associate; establishing a secure wireless communication channel with a user device; and wirelessly transmitting, from the system to the user device and over the secure wireless communication channel the populated application; instructions to cause the user device to authenticate the user based on successful validation of one or more user authentication credentials; and instructions to cause the user device, in response to authenticating the user, present the populated application to the user for verification of its accuracy.

Some embodiments receive, from the user device and over the secure wireless communication channel, confirmation that the populated application is accurate; and, in response to receiving confirmation that the populated application is accurate, submit the populated application to a back-end system for acting on the populated application. Some of these embodiments receive, from the backend system, confirmation that the populated application has been accepted by the backend system; and transmit instructions to the user device to cause the user device to alert the user that the populated application has been accepted.

In some cases, embodiments receive, from the user device and over the secure wireless communication channel, an indication that the populated application is at least partially inaccurate; in response to receiving the indication that the populated application is at least partially inaccurate, unlock the application for editing by the associate; receive one or more edits from the associate and apply them to a repopulated application; and wirelessly transmit instructions, to the user device and over the secure wireless communication channel, to cause the user device to present the repopulated application to the user for verification of its accuracy. In some cases, these embodiments receive, from the user device and over the secure wireless communication channel, confirmation that the repopulated application is accurate; and, in response to receiving confirmation that the repopulated application is accurate, submitting the repopulated application to a back-end system for acting on the repopulated application. Some such embodiments receive, from the backend system, confirmation that the repopulated application has been accepted by the backend system; and transmit instructions to the user device to cause the user device to alert the user that the repopulated application has been accepted.

Some embodiments wirelessly transmit instructions, to the user device and over the secure wireless communication channel, to cause the user device to request and receive a user signature verifying that the populated application is accurate; receive, from the user device and over the secure wireless communication channel, confirmation that the populated application is accurate, the confirmation comprising an electronic copy of the user's signature; and, in response to receiving confirmation that the populated application is accurate, submitting the populated application and the electronic copy of the user's signature to a back-end system for acting on the populated application. Some such embodiments receive verification from the back-end system that the electronic copy of the user's signature matches a stored copy of the user's signature, thereby further validating the user's identity. Other such embodiments cause the electronic copy of the user's signature to be stored and associated with the populated application for subsequent retrieval and verification of confirmation of the accuracy of the populated application.

Some embodiments receive an indication, from the associate, that the populated application is ready for transmission to the user device; in response, establish the secure wireless communication channel with the user device; close editing access, at the system and by the associate, to the populated application; grant viewing access and limited editing access, at the user device and by the authenticated user, to view the populated application and to submit a user signature, without granting editing access to the populated application other than for submitting the user signature and date. Some such embodiments receive the user signature, from the user device and over the secure wireless communication channel; in response, close viewing access and limited editing access, at the user device and by the authenticated user; and grant viewing access to the populated application and the user signature, at the system and by the authenticated associate. Some of these embodiments receive verification, from the associate, that the populated application and user signature is ready for submission to a back-end system for acting on the populated application; and, in response to receiving the user signature and associate verification that the populated application is ready for submission, submitting the populated application and an electronic copy of the user's signature to the back-end system for acting on the populated application.

Referring now to FIG. 1, a block diagram illustrating an authentication technology environment 100 configured for facilitating a user activity (such as filling out an account opening application with a financial institution) and providing real-time approval notifications is shown. As illustrated, the authentication technology environment 100 may comprise a user device 120, a peripheral and/or authentication device 160, an associate system 140, an enterprise database and/or back-end system 170, and/or a third party system 190 in operative communication via a network 101.

Typically, the associate system 140 is operatively connected with the enterprise database 170 as well as the user device 120, via the network 101, which may be the Internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network.

In some embodiments, the user device 120 may be a stand-alone device that is configured to facilitate the user activity, at least in part. In this regard, in some instances, the user device is configured to be coupled to, or establish operative communication with a associate system 140, such that the user 102 may conduct a user activity via the user device 120.

The user device 120 may refer to one or more devices that are configured to be associated with or connected to the authentication device 160, that are associated or connected to an authentication device 160 and/or that comprise the authentication device 160. The user device 120 may be or include a user device 120A (e.g., a mobile device such as a tablet computer), user device 120B (e.g., a desktop computer) or user device 120C (e.g., a mobile device such as a smartphone). The user device 120 may be or include a mobile communication device, such as a cellular telecommunications device (i.e., a smart phone or mobile phone), a computing device such as a laptop computer, a personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

As illustrated in FIG. 1, the associate system 140 may include a communication device 144, a processing device 142, and a memory device 150 having an authentication module 154, a processing system application 156 and a processing system datastore 158 stored therein. As shown, the processing device 142 is operatively connected to and is configured to control and cause the communication device 144, and the memory device 150 to perform one or more functions. Furthermore, the processing device 142 is, in some embodiments, configured to control and cause the processing device 122 of the user device 120, and/or the authentication device 160 to perform one or more functions. In some embodiments, the authentication module 154 and/or the real-time approval application 156 comprises computer readable instructions that when executed by the processing device 152 cause the processing device 142 to perform one or more functions and/or transmit control instructions to the user device 120, the authentication device 160, the back-end system 170, the third party system 190, and/or the communication device 144. It will be understood that the authentication module 154 and/or the real-time approval application 156 may be executable to initiate, perform, complete, and/or facilitate one or more portions of any embodiment described and/or contemplated herein, and specifically embodiments directed to user activities, user authentication and/or the like. The authentication module 154 may comprise executable instructions associated with one or more authentication steps of user activities, and may me embodied within the real-time approval application 156 in some instances. The associate system 140 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 144 may generally include a modem, server, transceiver, and/or other devices for communicating with other devices on the network 101. The network communication device 144 may be a communication interface having one or more communication devices configured to communicate with one or more other devices on the network 101, such as the processing system 140, other processing systems, data systems, etc.

Additionally, referring to associate system 140, the processing device 142 may generally refer to a device or combination of devices having circuitry used for implementing the communication and/or logic functions of the associate system 140. For example, the processing device 142 may include a control unit, a digital signal processor device, a microprocessor device, and various analog-to-digital converters, digital-to-analog converters, and other support circuits and/or combinations of the foregoing. Control and signal processing functions of the associate system 140 may be allocated between these processing devices according to their respective capabilities. The processing device 142 may further include functionality to operate one or more software programs based on computer-executable program code thereof, which may be stored in a memory device 130, such as the real-time approval application 156 and the authentication module 154. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 142 may be configured to use the network communication interface of the communication device 144 to transmit and/or receive data and/or commands to and/or from the other devices/systems connected to the network 101.

Furthermore, a "user interface" (not illustrated) may be associated with the associate system 140 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the associate system 140. As another example, the user interface may be provided on the user device 120, such as user interface 126, that may be controlled by the associate system 140 either directly or via the processing device 122 of the user device 120.

The memory device 150 within the associate system 140 may generally refer to a device or combination of devices that store one or more forms of computer-readable media for storing data and/or computer-executable program code/instructions. For example, the memory device 150 may include any computer memory that provides an actual or virtual space to temporarily or permanently store data and/or commands provided to the processing device 142 when it carries out its functions described herein. The associate system 140 may be used by a third party system 190 to interact with the user device 120, based on providing requisite authorization.

As further illustrated in FIG. 1, the user device 120 may include a communication device 124, a processing device 122, a user interface 126, an authentication device 160 and a memory device 130 having an authentication module 134, a user device datastore 136 and a real-time approval application 132 stored therein. The processing system 140 is typically configured to transmit control instructions to, and cause the processing device 122 to perform one or more steps of the embodiments presented herein. As shown, the processing device 122, in turn, is operatively connected to and is configured to control and cause the communication device 124, the user interface 126, the authentication device 160 and the memory device 130 to perform one or more functions, at least in part. In some embodiments, the real-time approval application 132 and/or the authentication module 134 comprises computer readable instructions that when executed by the processing device 122 cause the processing device to perform one or more functions and/or transmit control instructions to the authentication device 160, the communication device 124, the user interface 126, and the memory device 130.

The communication device 124 may comprise a modem, server, transceiver, and/or other device for communicating with other devices and systems on a network. The communication device 124 may further comprise a contact, contactless, wireless and/or wired interface that is configured to establish communication between the authentication device 160 and the user device 120, as particularly the processing device 122 and in turn the processing system 140.

The user interface 126 of the user device 120 may include a display (e.g., a liquid crystal display, a touchscreen display, and/or the like) which is operatively coupled to the processing device 122. The user interface 126 may include any number of other devices allowing the user device 120 to transmit/receive data to/from a user, such as a keypad, keyboard, touch-screen, touchpad, microphone, mouse, joystick, other pointer device, button, soft key, and/or other input device(s). The user interface 126 may further comprise output devices including a display that provides instructions in information regarding the user activity and authentication steps associated with the user activity. In some embodiments where the user device 120 requests the user's signature (if needed), the display may also serve as a touchpad input device to input the user's signature via a stylus. Other output devices may include one or more LEDs or an audio speaker, both which may indicate to the user that data has been successfully received from the authentication device 160. A printer that can print paper receipts may also be incorporated into the user device 120.

As further illustrated in FIG. 1, the memory device 130 may include a real-time approval application 132 and an authentication module 134. In some embodiments, the real-time approval application 132 and/or the authentication module 134 may be executable to initiate, perform, complete, and/or facilitate one or more portions of any embodiment described and/or contemplated herein, either independently or in response to receiving control instructions from the associate system 140. In some instances the authentication module 134 is a part of the real-time approval application 132. Generally, the real-time approval application 132 is executable to receive transaction instructions from the user and perform typical transaction terminal functions, as appreciated by those skilled in the art.

The user device 120 may require users to identify and/or authenticate themselves before the user device 120 may initiate, perform, complete, and/or facilitate a user activity. For example, in some embodiments, the user device 120 is configured (and/or the real-time approval application 132 is executable) to authenticate a user 102 based at least partially on a transaction terminal debit card, smart card, token (e.g., USB token, etc.), username, password, PIN, biometric information, and/or one or more other credentials that the user presents to the user device 120. Additionally or alternatively, in some embodiments, the user device 120 is configured to authenticate a user by using one-, two-, or multi-factor authentication. For example, in some embodiments, the user device 120 requires two-factor authentication, such that the user must provide a valid debit card and enter the correct PIN associated with the debit card in order to authenticate the user to the user device 120. However, either alternatively or in addition to the aforementioned authentication features, the user device 120 may require additional authentication of the user 102 before initiating, performing, completing, and/or facilitating a user activity.

Figure 2:
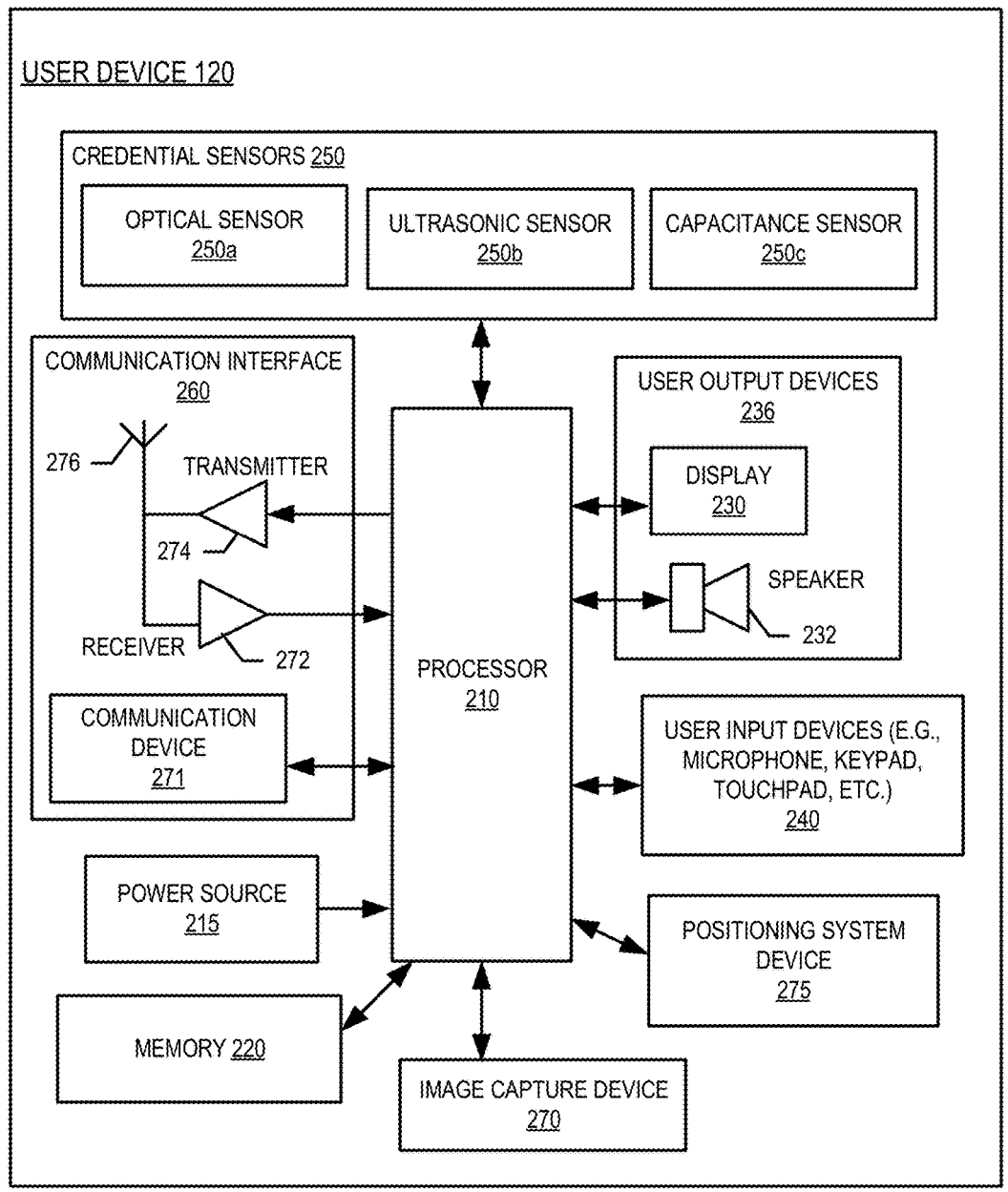
FIG. 2 is a block diagram of a user device 120, in accordance with embodiments of the invention.

Referring now to FIG. 2, one embodiment of the user device 120 is illustrated. The user device is typically configured to receive credentials from the user 102. In this regard, the user device 120 may comprise one or more credential sensors 250 that are configured to retrieve, receive, analyze and or validate credentials associated with the user. In this regard, the credential sensors 250 may comprise optical sensors 250a, ultrasonic sensors 250b, and/or capacitance sensors 250c. The one or more credential sensors 250 may further comprise radio frequency, thermal, pressure, piezoresistive/piezoelectric, microelectromechanical sensors, and the like.

As outlined previously, authentication using phalangeal credentials of the user may comprise fingerprint recognition, finger vein recognition, and/or recognition of other phalangeal credentials like palm veins, palm prints, digital bone anatomy/structure and positioning. As such, the receiving credentials may comprise the sensors 250 scanning/identifying/determining one or more phalanges/fingers of the user positioned appropriately on or proximate to the credential sensors 250. In this regard, the user may choose to provide/scan one or more phalanges/fingers simultaneously, consecutively, in a pattern, in a predetermined sequence, and/or tap one or more phalanges/fingers simultaneously, consecutively, in a pattern, in a predetermined sequence. The credential sensors 250 are typically configured to identify, recognize, and/or analyze the credentials provided in the aforementioned ways.

The one or more credential sensors 250, either singularly or in combination may be configured to recognize/receive the credentials of the user and also determine one or more parameters associated with the credentials. Phalangeal parameters typically comprise characteristics of the phalangeal credentials provided by the user. In this regard, determining phalangeal parameters may comprise determining positioning and orientation of the phalanges/fingers of the user, determining pressure of the phalanges/fingers, identifying the fingers, determining a sequence and/or timing of the phalangeal pattern/tapping and the like.

In some embodiments, the credential sensor 250 comprises an interface for the user to provide credentials. In some embodiments, the one or more credential sensors may comprise a common interface for receiving the credentials, while in other embodiments the credential sensors may comprise multiple interfaces. In some instances, the interface takes the form of a tactile interface such as a screen of predetermined dimensions for the users to place their phalanges/fingers. This screen may be connected to one or more credential sensors 250, such that the sensors 250 may sense the phalangeal credentials and the phalangeal parameters.

Optical sensors 250a typically involve optical imaging of the features of the user's phalanges/fingers using visible light. Ultrasonic sensors 250b typically involve creating visual images of the phalangeal credentials using high frequency sound waves that are configured to penetrate the epidermal layer of the skin such that fingerprints along the dermal layer of the skin may be captured. The dermal layer may reflect the sound waves, which may be captured to form an image of the fingerprint, determine positioning of the fingers and other phalangeal credentials and phalangeal parameters. The high frequency sound waves may be generated using piezoelectric transducers. Capacitance Sensors 250c typically involve capturing images of the phalangeal credentials using the properties of a parallel plate capacitor. The capacitance sensors 250c typically comprise a sensor array pixels that each act as one plate of a parallel plate capacitor, while the electrically conductive dermal layer of skin acts as the second plate of the parallel plate capacitor. The capacitance sensor 250c is configured to determine the varying capacitance between the valleys and ridges of the dermal layer to generate the image, such as a fingerprint, for authentication. The change in measured capacitance may also be utilized to determine phalangeal parameters of the credentials. The capacitance sensors 250c may comprise active and/or passive capacitance sensors.

The user device 120 may further include various features, such as a processor 210, such as a processing device or a microprocessor, communicably coupled to the credential sensors 250, a memory device 220, user output devices 236, user input devices 240, a network communication interface 260 comprising a communication device 271, and/or a power source 215. Optionally, in other embodiments, the processor 210 may be coupled to other features of the user device such as an image capture device 270, a positioning system device 275, and the like.

Typically, the communication device 271 of the network communication interface 260 is configured to establish operative communication with the associate system 140. In this regard, the communication interface 260 comprises a transmitter 274, a receiver 272 to transmit and receive signals from corresponding devices of the communication device 124 of the user device 120 via a suitable transmission medium or a communication channel. In some embodiments, the user device 120 is configured to be coupled/connected to the associate system 140 via wired communication channel. For example, the communication device 271 may comprise a plug that may be inserted into a complementary port on the transaction terminal 271. In other embodiments, the user device 120 is configured to be coupled/connected to the associate system 140 via a wireless and/or contactless communication channel. In this regard, the wireless communication channel may comprise near field communication (NFC), communication via radio waves, communication through the internet, communication via electromagnetic waves and the like. In one embodiment, the user device 120 may include a transceiver, i.e., one or more antennas and and/or other electronic circuitry, devices, and software, for receiving credential/authentication data and/or application data when the user device 120 is held close to or tapped at a suitable location of the associate system 140. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 at the user device 120 may transmit and receive radio frequency signals, respectively, from the associate system 140 within a distance of up to approximately 25 cm, and preferably from 0-20 cm, such as from 0-15 cm, and 0-10 cm.

Establishing the communication channels may also include signaling information in accordance with the air interface standard of the applicable cellular system of the wireless telephone network that may be part of the network 101. In this regard, the user device 120 may be configured to operate with one or more air interface standards, communication protocols, modulation types, and access types. By way of illustration, the user device 120 may be configured to operate in accordance with any of a number of first, second, third, and/or fourth-generation communication protocols and/or the like. For example, the user device 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 120 may also be configured to operate in accordance with non-cellular communication mechanisms, such as via a wireless local area network (WLAN) or other communication/data networks.

Figure 3:
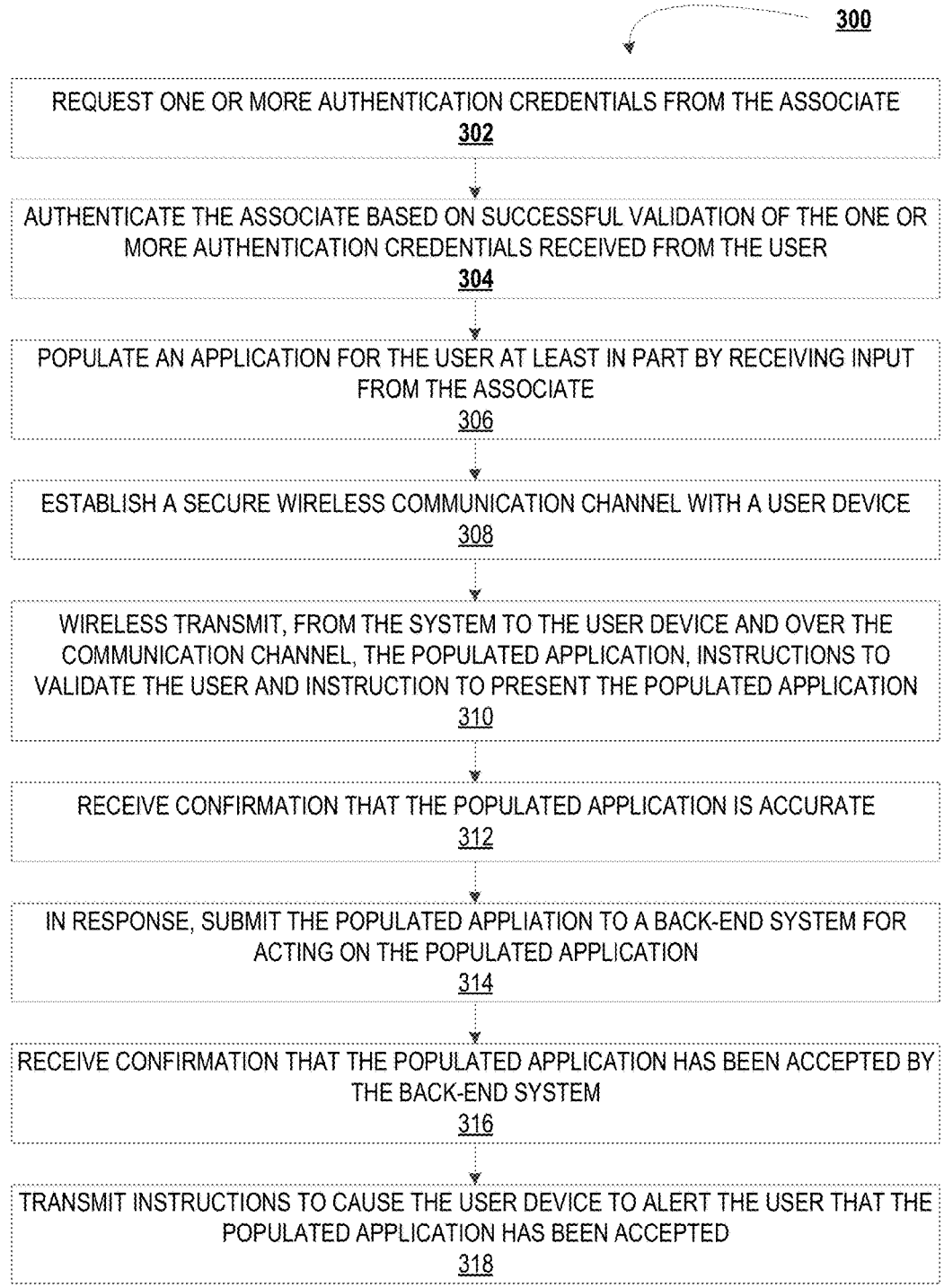
FIG. 3 is a flowchart illustrating a high level process flow for user and associate authentication and real-time approval notification, in accordance with embodiments of the invention.

Referring now to FIG. 3, illustrating a high level process flow 300 for user authentication and real-time approval notification. At block 302, the system requests one or more authentication credentials from the associate. Next, at block 304, the system authenticates the associate based on successful validation of the one or more authentication credentials received from the user. Next, at block 306, the system populates an application for the user at least in part by receiving input from the associate. In many cases, the associate is conducting an in-person meeting with the user/customer in order to establish or deepen a relationship by completing and submitting an application for opening an account. The associate may ask the user questions so that the associate may manually enter information for the application into the associate system. In some embodiments, the associate system populates some or all the application by accessing a customer profile associated with the customer and extracting data from the profile and inputting it into the application.

Next, at block 308, the system establishes a secure wireless communication channel with a user device. Then, at block 310, the system wirelessly transmits the populated application and instructions to validate the user and/or instructions to present the populated application. The transmission, in some embodiments, is from the system to the user device over the secure wireless communication channel.

Next, at block 312, the system receives confirmation that the populated application is accurate. In response to receiving confirmation, the system next submits the populated application to a back-end system for acting on the populated application, as represented by block 314. Next, at block 316, the system receives confirmation that the populated application has been accepted by the back-end system. Finally, at block 318, the system transmits instructions to cause the user device to alert the user that the populated application has been accepted.

Figure 4:
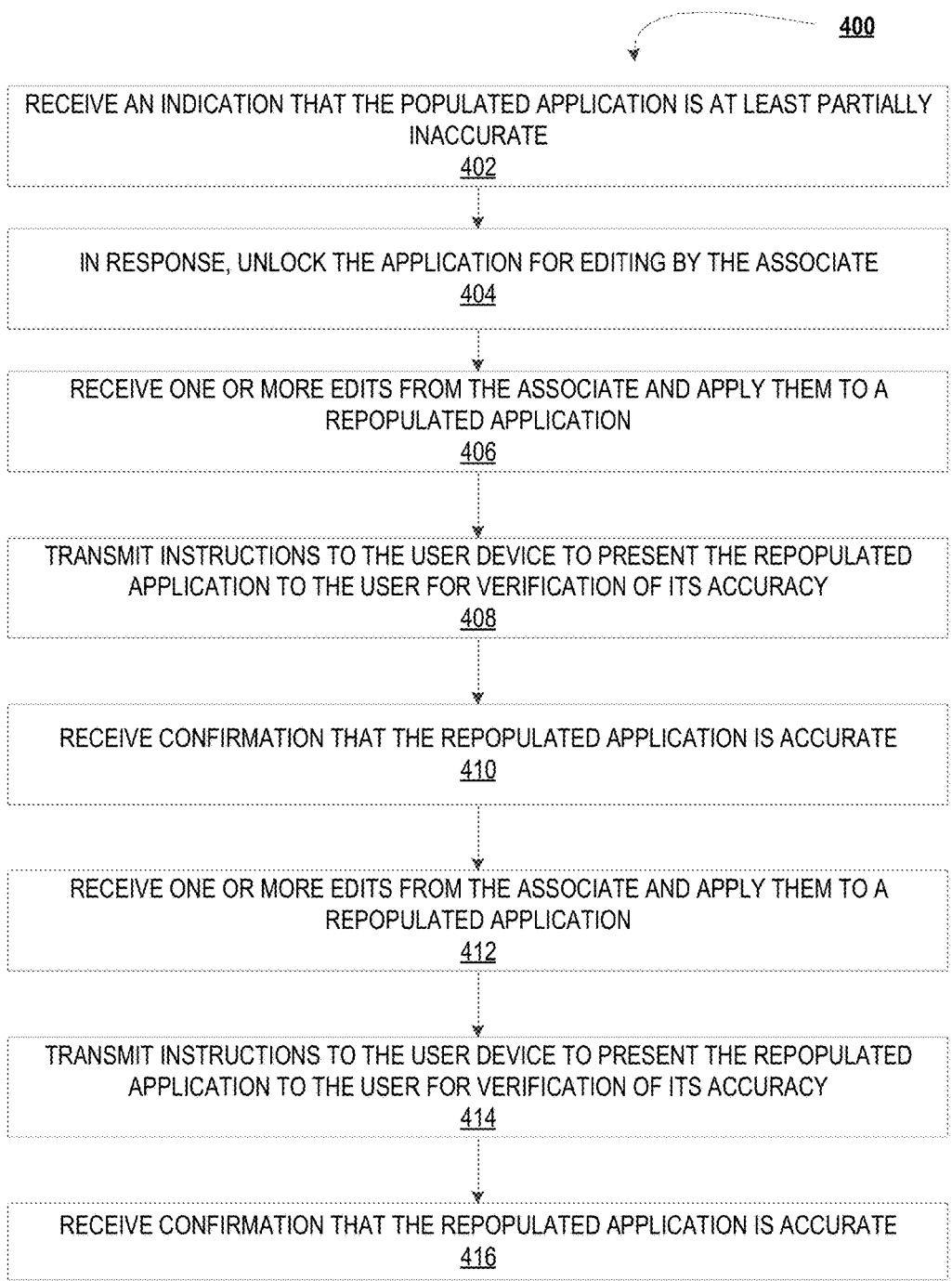
FIG. 4 is a flowchart illustrating a high level process flow for user and associate authentication and real-time approval notification, in accordance with embodiments of the invention.

Referring now to FIG. 4, a method 400 for user authentication and real-time approval notification begins with receiving an indication that the populated application is at least partially inaccurate, as represented by block 402. Next, at block 404, the system unlocks the application for editing by the associate in response to receiving the indication that the application is partially inaccurate. Next, at block 406, the system receives one or more edits from the associate and applies them to a repopulated application. Next, at block 408, the system transmits instructions to the user device to present the repopulated application to the user for verification of its accuracy. Then, the system receives confirmation that the repopulated application is accurate, as represented by block 410. Next, at block 412, the system receives one or more edits from the associate and applies them to a repopulated application. Then, as represented by block 414, the system transmits instructions to the user device to present the repopulated application to the user for verification of its accuracy. Finally, as represented by block 416, the system receives confirmation that the repopulated application is accurate.

Figure 5:
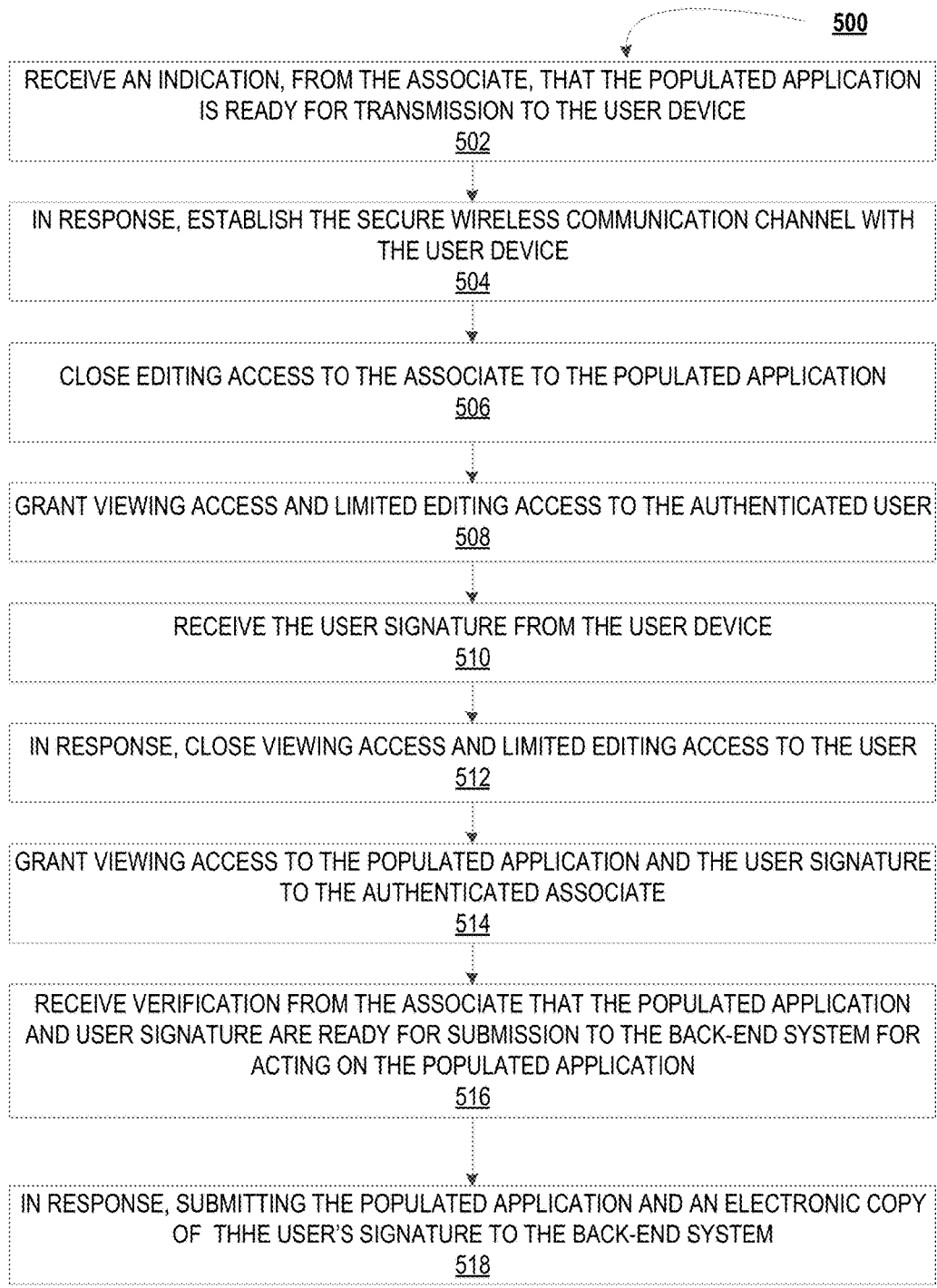
FIG. 5 is a flowchart illustrating a high level process flow for user and associate authentication and real-time approval notification, in accordance with embodiments of the invention.

Referring now to FIG. 5, a method 500 for user authentication and real-time approval notification begins with the system receiving an indication, from the associate, that the populated application is ready for transmission to the user device, as represented by block 502. Next, at block 504, the system establishes the secure wireless communication channel with the user device in response to receiving the indication that the populated application is ready for transmission. Then, as represented by block 506, the system closes editing access to the associate to the populated application. Next, at block 508, the system grants viewing access and limited editing access to the authenticated user. The limited editing access may include only the opportunity to input a signature and, in some cases, a date or other authentication information and/or confirmation of the completeness of the application. Then, at block 510, the system receives the user signature from the user device. Next, the system closes viewing access and limited editing access to the user, as represented by block 512. Then, the system grants viewing access to the populated application and the user signature to the authenticated associate, as represented by block 514 and receives verification from the associate that the populated application and user signature are ready for submission to the back-end system for acting on the populated application, as represented by block 516. Next, at block 518, the system submits the populated application and an electronic copy of the user's signature to the back-end system in response to receiving verification that the application and signature are ready for submission.

User authentication may be required in a variety of situations such as when a customer enters a resource location and wishes to perform one or more transactions. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Figure 6A:
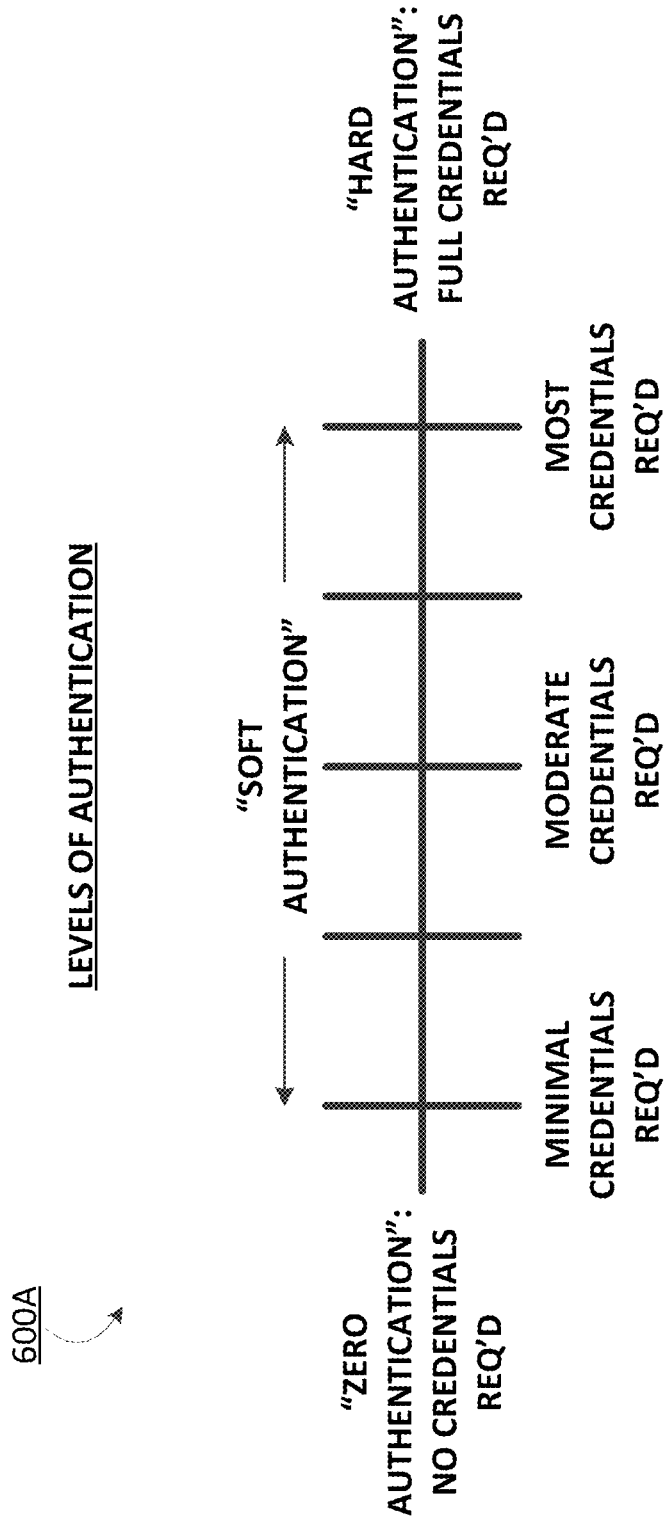
FIGS. 6A, 6B and 6C are diagrams illustrating an authentication/function continuum according to embodiments of the invention.

Referring to FIG. 6A, a continuum of authentication 600A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 6C, the continuum of authentication 600A may be coupled with an application functions permitted continuum 600B, first illustrated in FIG. 6B.

Figure 6B:
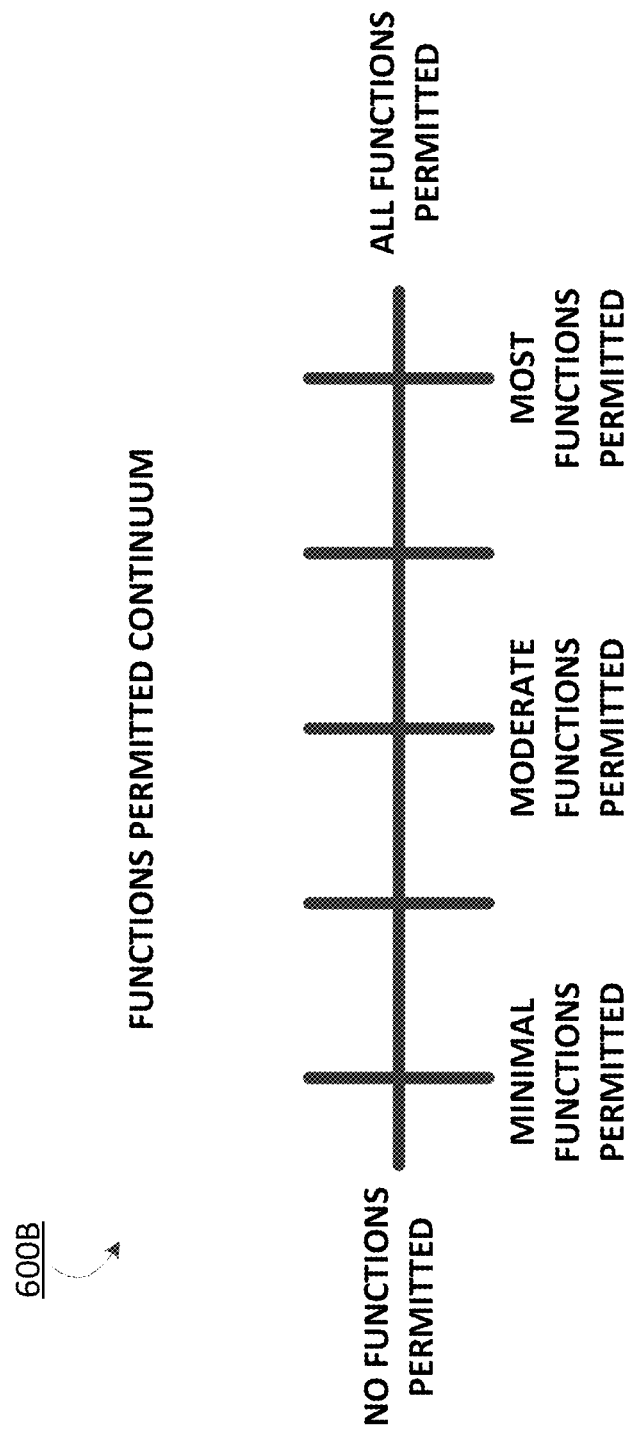

Referring to FIG. 6B, the functions permitted continuum 600B illustrates various levels of functions, access, and/or transactions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 600B corresponds with a certain amount and/or number of functions that are permitted and/or the context in which certain functions are permitted.

Figure 6C:
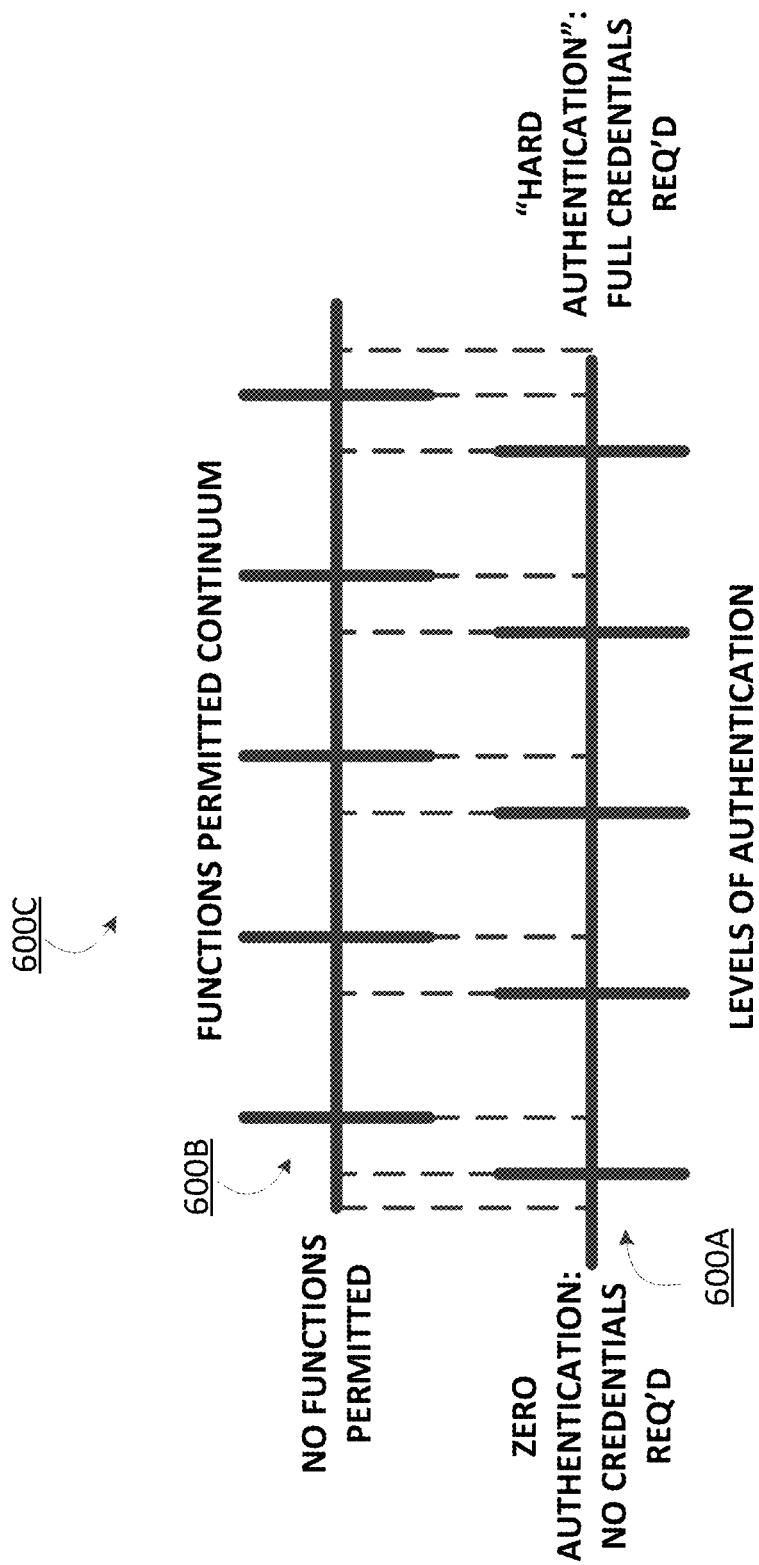

Referring now to FIG. 6C, a diagram 600C illustrates a coupling of the application functions permitted continuum 600B and the levels of authentication continuum 600A. As shown, the continua 600B and 600A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 600A provides that a particular function or functions may be permitted given that a specified level of authentication credentials are supplied, as indicated by the corresponding point on continuum 600A. For example, a financial institution and/or a user may arrange the continua 600B and 600A with respect to one another and may adjust the arrangement based on changing desires or goals.

In some embodiments, one or both the continua 600B and 600A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 7, a diagram 700 illustrates a process for authenticating a user and enabling real-time approval notifications according to embodiments of the invention. The diagram 700 has numerous layers including a workstation 702, security framework 704, user interfaces 706, profile ID lookups 708, extended lookups 710, rules engines 712, client communications 714 and document storage 716. First, an associate, working with her desktop 718 may request a master profile ID (MPID) 720. The security framework layer 704 may get the MPID and any other necessary information such as a boss ID, the representative's name and the like, which may be inferred from the context of the situation. In other words, the MPID, boss ID and representative name may be inferred by the fact that the particular workstation that is requesting the MPID is assigned to the particular associate, as represented by block 726. This step may involve putting the application for a new account, for example, into context and, in some cases, pre-fills data in the application. The security framework 704 can communicate through the associate workstation (for example, the desktop) user interface 728. The associate workstation UI 728 uses an API to get an existing ID for the customer as represented by block 724. Also, the desktop 718 validates and authenticates the session by confirming any required credentials of the associate, as represented by block 722.

In step 730, the extended lookup service verifies the customer profile information, such as by making sure the best customer profile, based on the context of the situation, is being used. In step 732, the documents may be saved and a token that tracks the process may be returned to the associate workstation UI 728. As represented by arrow 734, the MPID may be updated and the work in progress (WIP) may be saved. In other words, the customer information may be updated, such as by correlating other accounts owned by the customer. The rules services of the workstation is typically sourced from one or more back-end servers of the enterprise and enables certain parameters associated with completion of the application. For example, when the associate is filing an application for a customer, the rules services 736 may prevent moving from page one (1) of the application to page two (2) of the application if page one (1) is incomplete. At one or more stages within the process of account opening and/or at the completion of account opening, the client communications layer 714 may send the customer a notification, such as a notification of the status of the application, or if it is complete, a notification of the completion of the application.

Concurrently with some or all the steps discussed above the customer, who may be working from a mobile device 740 validates his or her identity using one or more credentials such as social security number (SSN), date of birth (DOB) or otherwise and the session is authenticated on the mobile device, as represented by block 742. The customer mobile device (e.g., a tablet computer) user interface (UI) 744 can communicate with the workstation 748 to retrieve the customer's image or other information about the customer to assist with authentication of the customer's identity. For example, the associate workstation may present the customer's image to the associate to confirm the customer's identity. In some cases, the document management services 750 may save a document and/or image, as represented by arrow 756 and/or arrow 752 such as saving a copy of the application (partially or completely finished) and/or a copy of an image of the customer in the system of record for new accounts (i.e., the document storage layer 716. In some cases, a document or image ID may be returned to the workstation, as represented by arrow 754. In some embodiments, a copy of the customer's identification card (such as a driver's license) is scanned or otherwise captured and saved in association with the application. Further, in some embodiments, a new account is connected or associated with all or some of the documents associated with the customer, for example, associating the new account with a customer's tax documents.

As represented by arrow 758, the customer mobile device UI 744 may retrieve the WIP of the application and/or submit the WIP associated with the application. A signature image (e.g., of the signature provided by the customer approving submission of the application for opening a new account) may be saved, as represented by arrow 760 and a token may be returned for tracking of the process. The rules services for the mobile device, as represented by block 762, implement rules such as rules dictating creation of user IDs, document posting, checking of customer ID, rules against fraud and the like. As represented by arrow 764, the client communication layer 764 sends customer notification regarding approval or denial of the application, such as approval or denial of a new account application. As represented by arrow 766, the document storage layer 716 saves the WIP of the application so that is may be retrieved for subsequent review.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating a user and an associate of an entity and enabling real-time approval notifications, the system comprising a processor operatively connected with at least one memory device, the system further comprising:
   a real-time approval module stored in the at least one memory device comprising computer readable instructions, that when executed by the at least one processor, cause the at least one processor to:
      request one or more authentication credentials from the associate;
      authenticate the associate based on successful validation of the one or more authentication credentials received from the associate;
      populate an application for the user at least in part by receiving input from the associate;
      receive an indication, from the associate, that the populated application is ready for transmission to the user device;
      in response to receiving the indication, (i) establish a secure wireless communication channel with a user device, (ii) close editing access, at the system and by the associate, to the populated application, and (iii) grant viewing access and limited editing access, at the user device and by an authenticated user of the user device, to view the populated application, wherein the limited editing access allows the authenticated user to submit at least one of a user signature and date, without editing in other portions of the populated application;

wirelessly transmit, from the system to the user device and over the secure wireless communication channel:

the populated application;

instructions to cause the user device to authenticate the user based on successful validation of one or more user authentication credentials; and instructions to cause the user device, in response to authenticating the user, present the populated application to the user for verification of its accuracy; and in response to the user submitting the user signature to the populated application, (i) receive, from the user device and over the secure wireless communication channel, an electronic copy of a user's signature, (ii) close viewing access and limited editing access, at the user device and by the authenticated user, and (iii) grant viewing access to the populated application and the user signature, at the system and by the authenticated associate.

2. The system of claim 1, wherein the computer readable instructions further cause the at least one processor to:

receive, from the user device and over the secure wireless communication channel, confirmation that the populated application is accurate; and in response to receiving confirmation that the populated application is accurate, submitting the populated application to a back-end system for acting on the populated application.

3. The system of claim 2, wherein the computer readable instructions further cause the at least one processor to:

receive, from the backend system, confirmation that the populated application has been accepted by the back-end system; and transmit instructions to the user device to cause the user device to alert the user that the populated application has been accepted.

4. The system of claim 1, wherein the computer readable instructions further cause the at least one processor to:

receive, from the user device and over the secure wireless communication channel, an indication that the populated application is at least partially inaccurate;

in response to receiving the indication that the populated application is at least partially inaccurate, open editing access to the application by the associate;

receive one or more edits from the associate and apply them to a repopulated application; and wirelessly transmit instructions, to the user device and over the secure wireless communication channel, to cause the user device to present the repopulated application to the user for verification of its accuracy.

5. The system of claim 4, wherein the computer readable instructions further cause the at least one processor to:

receive, from the user device and over the secure wireless communication channel, confirmation that the repopulated application is accurate; and in response to receiving confirmation that the repopulated application is accurate, submitting the repopulated application to a back-end system for acting on the repopulated application.

6. The system of claim 5, wherein the computer readable instructions further cause the at least one processor to:

receive, from the backend system, confirmation that the repopulated application has been accepted by the back-end system; and transmit instructions to the user device to cause the user device to alert the user that the repopulated application has been accepted.

7. The system of claim 1, wherein the computer readable instructions further cause the at least one processor to:

wirelessly transmit instructions, to the user device and over the secure wireless communication channel, to cause the user device to request and receive a user signature verifying that the populated application is accurate;

receive, from the user device and over the secure wireless communication channel, confirmation that the populated application is accurate, the confirmation comprising an electronic copy of the user's signature; and in response to receiving confirmation that the populated application is accurate, submitting the populated application and the electronic copy of the user's signature to a back-end system for acting on the populated application.

8. The system of claim 7, wherein the computer readable instructions further cause the at least one processor to:

receive verification from the back-end system that the electronic copy of the user's signature matches a stored copy of the user's signature, thereby further validating the user's identity.

9. The system of claim 7, wherein the computer readable instructions further cause the at least one processor to:

cause the electronic copy of the user's signature to be stored and associated with the populated application for subsequent retrieval and verification of confirmation of the accuracy of the populated application.

10. The system of claim 1, wherein the computer readable instructions further cause the at least one processor to:

receive verification, from the associate, that the populated application and user signature is ready for submission to a back-end system for acting on the populated application;

in response to receiving the user signature and associate verification that the populated application is ready for submission, submitting the populated application and an electronic copy of the user's signature to the back-end system for acting on the populated application.

11. A computer program product for authenticating a user and an associate of an entity and enabling real-time approval notifications, wherein the computer program product comprising a non-transitory computer-readable storage medium having computer-executable instructions to:

request one or more authentication credentials from the associate;

authenticate the associate based on successful validation of the one or more authentication credentials received from the associate;

populate an application for the user at least in part by receiving input from the associate;

receive an indication, from the associate, that the populated application is ready for transmission to the user device;

in response to receiving the indication, (i) establish a secure wireless communication channel with a user device, (ii) close editing access, at the system and by the associate, to the populated application and (iii) grant viewing access and limited editing access, at the user device and by an authenticated user of the user device, to view the populated application, wherein the limited editing access allows the authenticated user to submit at least one of a user signature and date, without editing in other portions of the populated application;

wirelessly transmit, from the system to the user device and over the secure wireless communication channel:
the populated application;
instructions to cause the user device to authenticate the user based on successful validation of one or more user authentication credentials; and
instructions to cause the user device, in response to authenticating the user, present the populated application to the user for verification of its accuracy;

in response to the user submitting the user signature to the populated application, (i) receive, from the user device and over the secure wireless communication channel, an electronic copy of a user's signature, (ii) close viewing access and limited editing access, at the user device and by the authenticated user, and (iii) grant viewing access to the populated application and the user signature, at the system and by the authenticated associate.

12. The computer program product of claim 11, wherein the computer-executable instructions are further to:
receive, from the user device and over the secure wireless communication channel, confirmation that the populated application is accurate; and
in response to receiving confirmation that the populated application is accurate, submitting the populated application to a back-end system for acting on the populated application.

13. The computer program product of claim 12, wherein the computer-executable instructions are further to:
receive, from the backend system, confirmation that the populated application has been accepted by the back-end system; and
transmit instructions to the user device to cause the user device to alert the user that the populated application has been accepted.

14. The computer program product of claim 11, wherein the computer-executable instructions are further to:
receive, from the user device and over the secure wireless communication channel, an indication that the populated application is at least partially inaccurate;
in response to receiving the indication that the populated application is at least partially inaccurate, open editing access to the application by the associate;
receive one or more edits from the associate and apply them to a repopulated application; and
wirelessly transmit instructions, to the user device and over the secure wireless communication channel, to cause the user device to present the repopulated application to the user for verification of its accuracy.

15. The computer program product of claim 14, wherein the computer-executable instructions are further to:
receive, from the user device and over the secure wireless communication channel, confirmation that the repopulated application is accurate; and
in response to receiving confirmation that the repopulated application is accurate, submitting the repopulated application to a back-end system for acting on the repopulated application.

16. The computer program product of claim 15, wherein the computer-executable instructions are further to:

receive, from the backend system, confirmation that the repopulated application has been accepted by the back-end system; and
transmit instructions to the user device to cause the user device to alert the user that the repopulated application has been accepted.

17. The computer program product of claim 11, wherein the computer-executable instructions are further to:
wirelessly transmit instructions, to the user device and over the secure wireless communication channel, to cause the user device to request and receive a user signature verifying that the populated application is accurate;
receive, from the user device and over the secure wireless communication channel, confirmation that the populated application is accurate, the confirmation comprising the electronic copy of the user's signature; and
in response to receiving confirmation that the populated application is accurate, submitting the populated application and the electronic copy of the user's signature to a back-end system for acting on the populated application.

18. A computerized method for authenticating a user and an associate of an entity and enabling real-time approval notifications, wherein the method comprises:
requesting one or more authentication credentials from the associate;
authenticating the associate based on successful validation of the one or more authentication credentials received from the associate;
populating an application for the user at least in part by receiving input from the associate;
receiving an indication, from the associate, that the populated application is ready for transmission to the user device;
in response to receiving the indication, (i) establish a secure wireless communication channel with a user device, (ii) close editing access, at the system and by the associate, to the populated application and (iii) grant viewing access and limited editing access, at the user device and by an authenticated user of the user device, to view the populated application, wherein the limited editing access allows the authenticated user to submit at least one of a user signature and date, without editing in other portions of the populated application; and
wirelessly transmitting, from the system to the user device and over the secure wireless communication channel:
the populated application;
instructions to cause the user device to authenticate the user based on successful validation of one or more user authentication credentials; and
instructions to cause the user device, in response to authenticating the user, present the populated application to the user for verification of its accuracy;
in response to the user submitting the user signature to the populated application, (i) receiving, from the user device and over the secure wireless communication channel, an electronic copy of a user's signature, (ii) closing viewing access and limited editing access, at the user device and by the authenticated user, and (iii) granting viewing access to the populated application and the user signature, at the system and by the authenticated associate.

* * * * *